April 15, 1930.　　　E. M. GRAVES　　　1,754,824
BOAT UNLOADING MECHANISM
Filed April 3, 1926
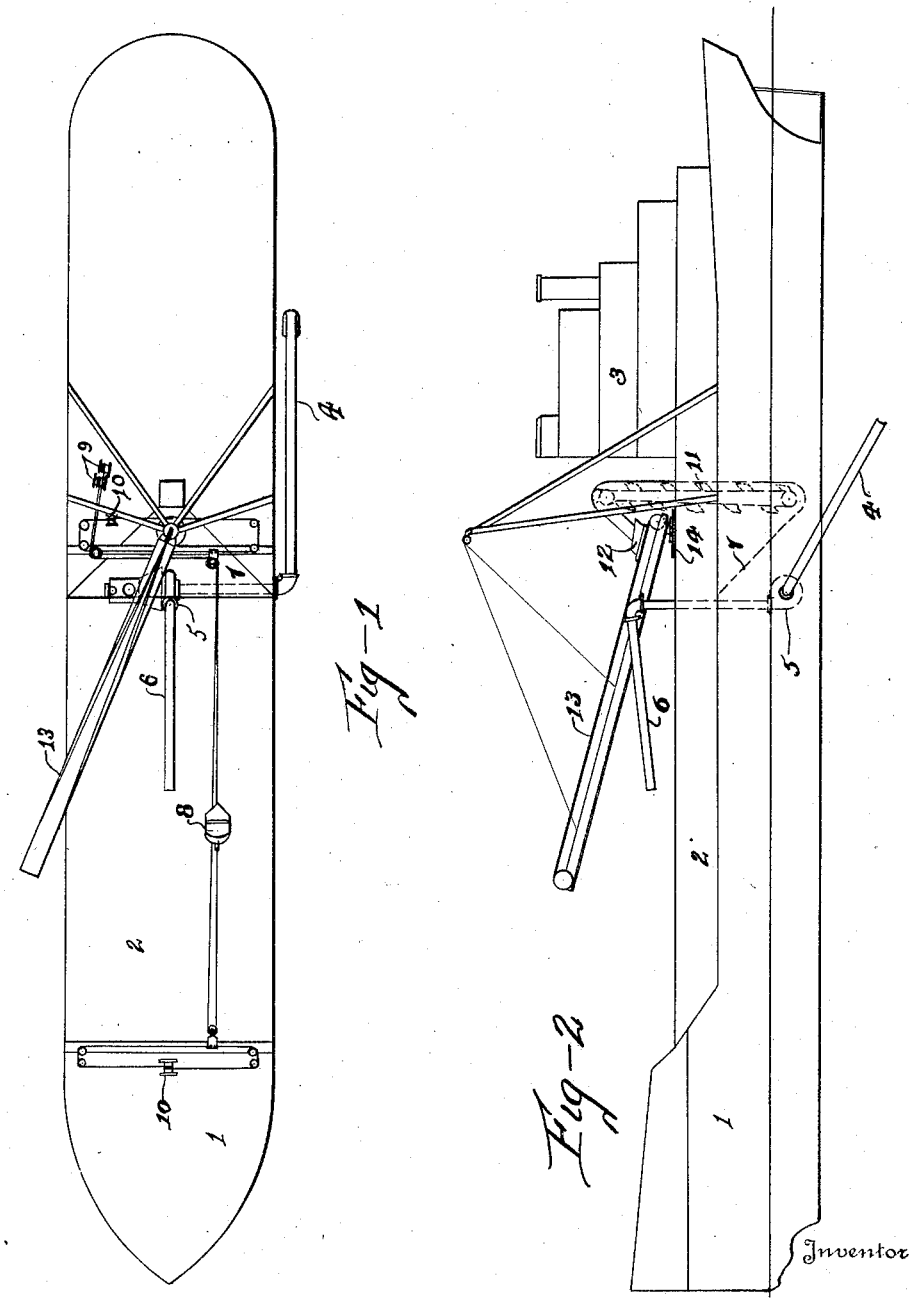
Inventor
Edward M. Graves.
By Brockett + Hyde
Attorney Patented Apr. 15, 1930

1,754,824

UNITED STATES PATENT OFFICE

EDWARD M. GRAVES, OF CLEVELAND HEIGHTS, OHIO

BOAT-UNLOADING MECHANISM

Application filed April 3, 1926. Serial No. 99,562.

This invention relates to means for unloading sand, gravel, or similar bulk cargo from the cargo deck or hold of a boat, and for discharging the same to a point beyond the beam, on either side and, within limits, at any desired elevation.

The objects of the invention are to unload such a cargo in the simplest manner possible and at the least expenditure of labor and time.

The exact arrangement of apparatus employed, according to my invention will be apparent from the following description and drawings in which Fig. 1 is a plan view of a so-called sand sucker showing the open cargo deck of the sucker and especially the means for unloading the cargo; and Fig. 2 is a side elevation of the same.

The principal parts of the boat chosen for illustration of my invention are the hull 1 upon which is located amidships the cargo deck 2, and astern thereof, the engine room, pilot house, crews quarters etc., generally indicated by the reference numeral 3.

As is customary in the art, the cargo deck is loaded with sand delivered from the outboard pipe 4 extending downward below the water line as indicated in the drawings, by means of the pump 5, and out through the delivery pipe 6, movable and extensible whereby an even distribution of the accumulating cargo may be obtained on the deck.

At the after end of the cargo deck is a hopper 7, its upper portion extending the full beam of the boat, and its sides converging downwards into a central pocket.

For the purpose of unloading the cargo a scraper bucket 8 is employed, operable for reciprocating movement along the deck by means of the rigging shown, operated through lines and suitable sheaves by the power driven drums 9; whereby the cargo may be scraped into the hopper 7 and from there delivered as will be described. The bucket 8 with its rigging is made movable across the deck by paired secondary riggings operated over suitable sheaves as illustrated, by the drums 10; arrangement being such that the direction of the primary rigging over the cargo deck will be always fore and aft.

Extending down into the hopper is a bucket elevating conveyor 11 whereby upon operation, the contents of the hopper will be delivered at the outlet 12 of the conveyor. Above the deck is a belt conveyor 13 supported in a suitable manner such as that illustrated for swinging movement but so that its receiving end will always lie beneath the delivery outlet of the bucket conveyor, while the delivery end may be swung in a large arc outboard as desired, and raised or lowered within limits as necessary; the swinging movement being controlled by suitably driven gearing 14.

Operation of the apparatus will be apparent: By suitable repeated operations of the scraper bucket, the deck cargo is gradually moved into the open end of the hopper, from the bottom of which it is picked up by the elevating conveyor, which delivers it to the inner end of the belt conveyor. The belt conveyor being swung outboard to the desired point of delivery, the cargo is unloaded at this point in a continuous flow.

The operation of the conveyors being continuous during the unloading process, and the position of the delivery conveyor 13 being fixed, once selected, it is obvious that practically the only direct labor required in unloading is manipulation of the scraper bucket. And, since no particular skill is required in the handling of the bucket, unloading labor is reduced to a minimum.

An advantage of my invention is that an even keel is automatically maintained during the unloading operation by gradually traversing the bucket back and forth across the cargo, the capacity of the bucket serving to limit the effective depth of the cut.

When the boat is under way, the delivery conveyor may be swung to a fore and aft position, lowered and secured.

What I claim is:

1. In a boat, a substantially flat cargo deck, a cargo hopper at one end thereof and having its mouth extending thereacross at substantially the same level, means for delivering cargo from said deck to said hopper mouth, elevating means for delivering cargo from said hopper to a point directly above the mouth thereof, and swinging conveying means having its receiving end arranged below the delivery point of said elevating means and adapted to convey the cargo to either side of the boat.

2. In a boat, a substantially flat cargo deck, a cargo hopper at one end thereof, a scraper for delivering cargo from said deck to said hopper, longitudinally disposed, and longitudinally movable cable means connected to said scraper for moving it longitudinally back and forth along said cargo deck, transversely disposed and transversely movable cable means associated with said longitudinally disposed cable means for moving said longitudinally disposed cable means, and hence said scraper, transversely back and forth across the deck, the arrangement being such that said scraper can be moved simultaneously both longitudinally and transversely of said deck.

In testimony whereof I hereby affix my signature.

EDWARD M. GRAVES.